(12) United States Patent
McQuilken et al.

(10) Patent No.: US 8,333,605 B2
(45) Date of Patent: Dec. 18, 2012

(54) LOCKING APPARATUS FOR ELECTRICAL CONNECTORS

(75) Inventors: Andrew McQuilken, Portsmouth (GB); Mark Plested, Portsmouth (GB); Scott Flower, Portsmouth (GB)

(73) Assignee: Harwin Plc. (GB)

( * ) Notice: Subject to any disclaimer, the term of this patent is extended or adjusted under 35 U.S.C. 154(b) by 330 days.

(21) Appl. No.: 12/769,688

(22) Filed: Apr. 29, 2010

(65) Prior Publication Data
US 2010/0279535 A1 Nov. 4, 2010

(51) Int. Cl.
H01R 4/50 (2006.01)
(52) U.S. Cl. ........................................... 439/332
(58) Field of Classification Search .................. 439/332, 439/372, 953, 348–349, 364, 360
See application file for complete search history.

(56) References Cited

U.S. PATENT DOCUMENTS

| | | | | |
|---|---|---|---|---|
| 3,564,563 A | | 2/1971 | Trotter et al. ............. | 24/221 |
| 4,026,623 A | | 5/1977 | Goodman et al. ......... | 339/75 |
| 4,207,655 A | * | 6/1980 | MacMaster ................ | 411/350 |
| 4,624,517 A | * | 11/1986 | Anhalt et al. ............. | 439/265 |
| 5,554,045 A | * | 9/1996 | Bethurum .................. | 439/372 |
| 5,588,866 A | * | 12/1996 | Rothenberger ............ | 439/372 |
| 5,800,197 A | * | 9/1998 | Hyzin ........................ | 439/372 |
| 5,842,560 A | * | 12/1998 | Kuki et al. ................. | 200/43.05 |
| 6,056,581 A | * | 5/2000 | Rothenberger ............ | 439/372 |
| 7,367,597 B2 | * | 5/2008 | Rechberg .................. | 292/304 |
| 7,874,779 B2 | * | 1/2011 | Csik et al. ................ | 411/553 |

FOREIGN PATENT DOCUMENTS
FR 2 612 264 9/1988
GB 2 190 423 11/1987

* cited by examiner

Primary Examiner — Jean F Duverne
(74) Attorney, Agent, or Firm — Renner Kenner Greive Bobak Taylor & Weber

(57) ABSTRACT

An apparatus suitable for locking two electrical connectors together is provided, the apparatus comprising: a first assembly comprising a locking member having a radially extending element; a collar with a through hole for receiving the locking member; and a spring positioned between the locking member and the collar, and a second assembly comprising a retaining member having a guide channel such that in use the radially extending element of the locking member is adapted to cooperate with the guide channel to form a bayonet type connection and lock the first assembly and second assembly together.

19 Claims, 6 Drawing Sheets

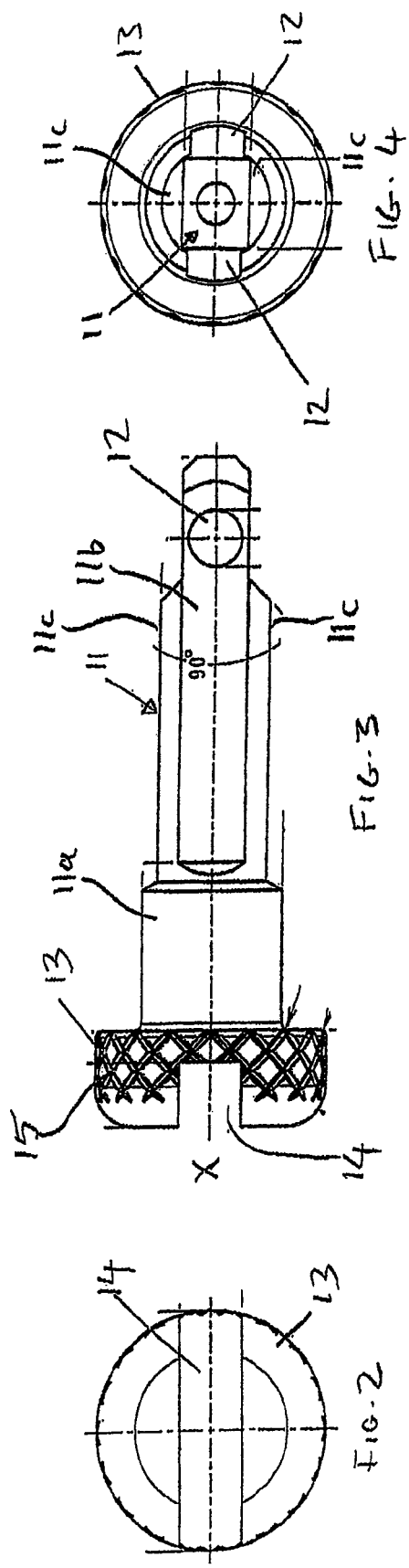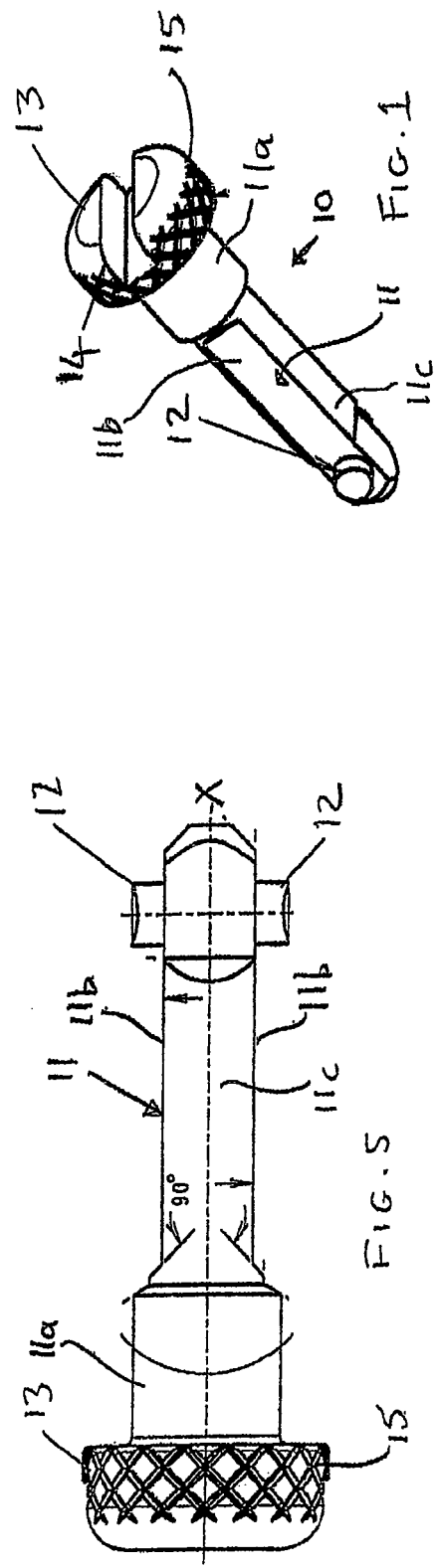

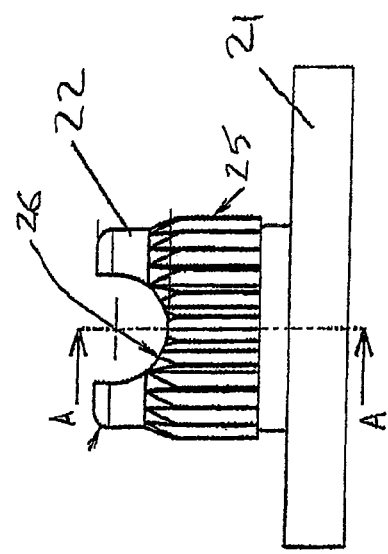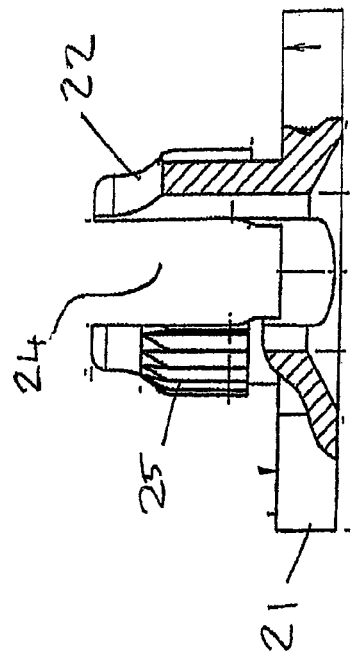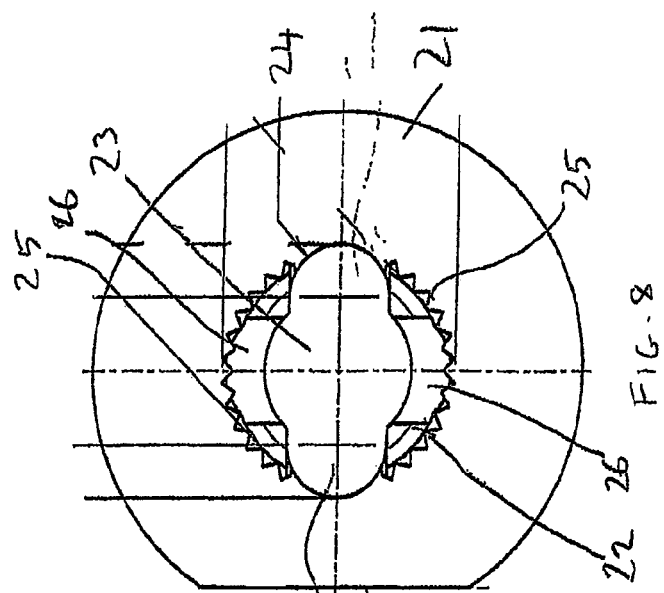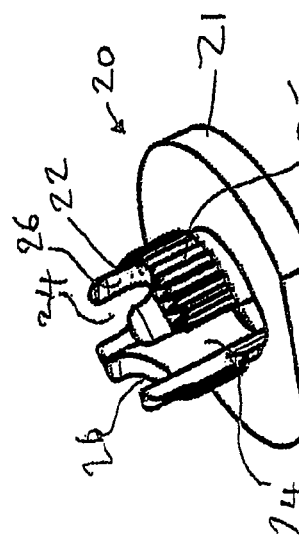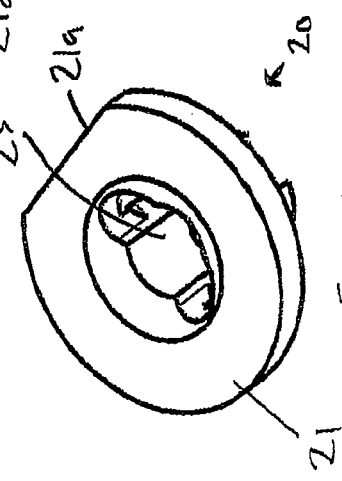

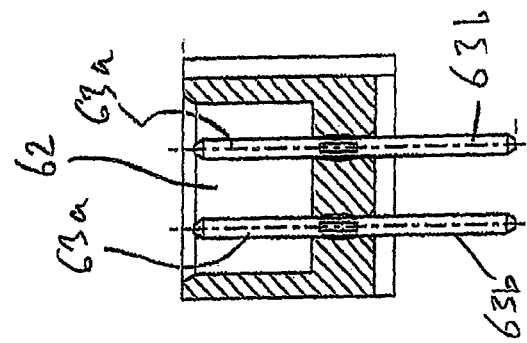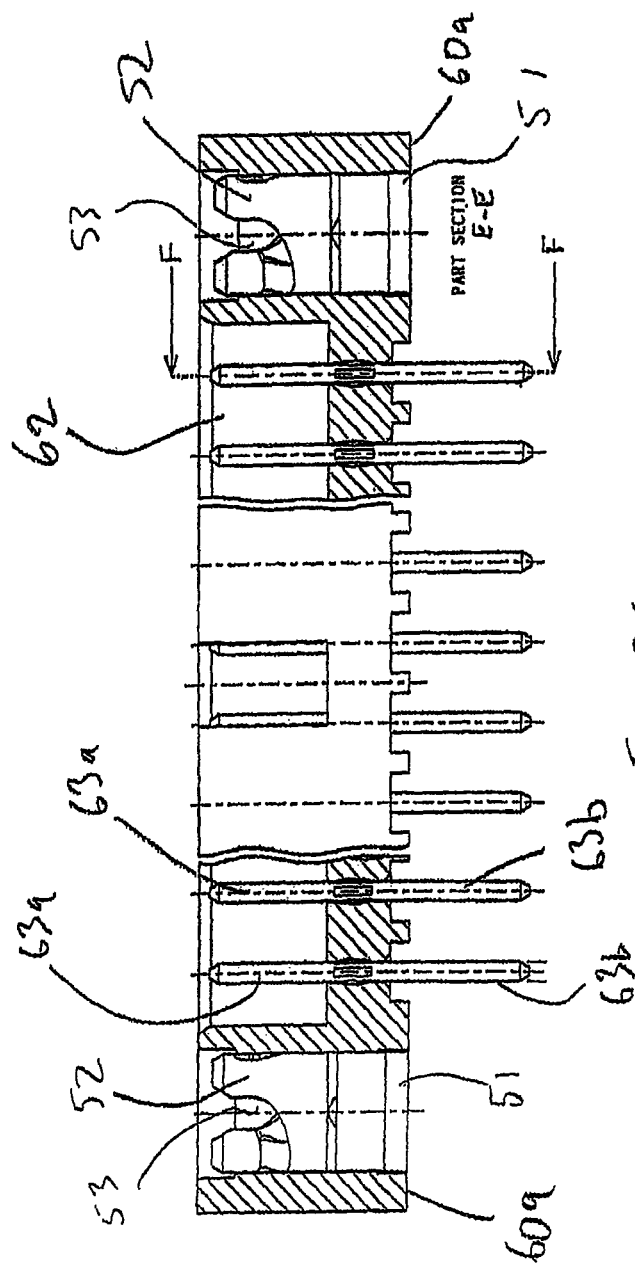

LOCKING APPARATUS FOR ELECTRICAL CONNECTORS

TECHNICAL FIELD

The present invention relates to locking apparatus. In particular, the present invention relates to electrical interconnection devices which include a locking apparatus to enable a secure connection to be made between two electrical interconnection devices.

Electrical interconnection devices are typically in the form of a male electrical connector which is adapted to be mated to a female electrical connector. The male connector normally has at least one electrical contact pin that is received in a socket in a female connector. In this manner, the male and female connectors cooperate with each other.

Once electrical connectors are mated they are typically held together by engagement forces that arise from the effect of a pin being squeezed in order to fit into a socket. Some types of miniature electrical connectors, such as D sub-miniature connectors which are used for serial connections to computers, include small screws in the male connector that are received in cooperating holes in a female connector. A user needs to align the screw with the hole and tighten in order to lock the D-type connectors together after mating. It can be difficult for users to quickly lock such male and female connectors together.

SUMMARY OF THE INVENTION

From a first aspect, the present invention provides an apparatus for locking two electrical connectors together, the apparatus comprising: a locking member having a radially extending element; and a retaining member having a guide channel such that in use the element is adapted to cooperate with the guide channel to form a bayonet type connection.

From a second aspect, the present invention provides an electrical connector comprising: an electrical contact section for electrically mating with another electrical connector; and a mechanical locking means including a locking member having a radially extending element for bayonet type connection with the other connector.

From a third aspect, the present invention provides an electrical connector comprising: an electrical contact section for electrically mating with another electrical connector; and a mechanical locking means including a retaining member having a guide channel for bayonet type connection with the other connector.

From a fourth aspect, the present invention provides a electrical connection arrangement comprising: a first electrical connector comprising an first electrical contact section and a first mechanical locking section; and a second electrical connector comprising a second electrical contact section and a second mechanical locking section, wherein the first electrical section is adapted to be electrically connected to the second electrical section, and the first mechanical locking section is adapted to be coupled to the second mechanical locking section by means of a bayonet-type connection.

From a fifth aspect, the present invention provide a method of constructing a locking mechanism for an electrical connector, comprising providing the connector with a bayonet-type connection.

This type of locking mechanism allows a male and female connector to be quickly and securely locked together after mating.

BRIEF DESCRIPTION OF THE DRAWINGS

In order that the present invention be more readily understood, embodiments will be described by way of example with reference to the accompanying drawings in which:

FIG. 1 shows a perspective view of a locking screw which forms part of a locking mechanism according to a first embodiment;

FIG. 2 shows a view of the locking screw of FIG. 1 from above;

FIG. 3 shows a view of the locking screw of FIG. 1 from one side;

FIG. 4 shows a view of the locking screw of FIG. 1 from below;

FIG. 5 shows a view of the locking screw of FIG. 1 from another side at ninety degrees to the view in FIG. 3;

FIG. 6 shows a first perspective view of a collar which forms another part of the locking mechanism according to the first embodiment; and FIG. 7 shows a second perspective view of the collar shown in FIG. 6.

FIG. 8 shows a view of the collar of FIG. 6 from above;

FIG. 9 shows a view of the collar of FIG. 8 from one side;

FIG. 10 shows a view of the collar of FIG. 9 in cross section along A-A;

FIG. 26 shows a part cross sectional view of FIG. 25 taken along E-E;

FIG. 27 shows a cross section view of FIG. 26 along F-F.

BEST MODE FOR CARRYING OUT THE INVENTION

Figure 11:
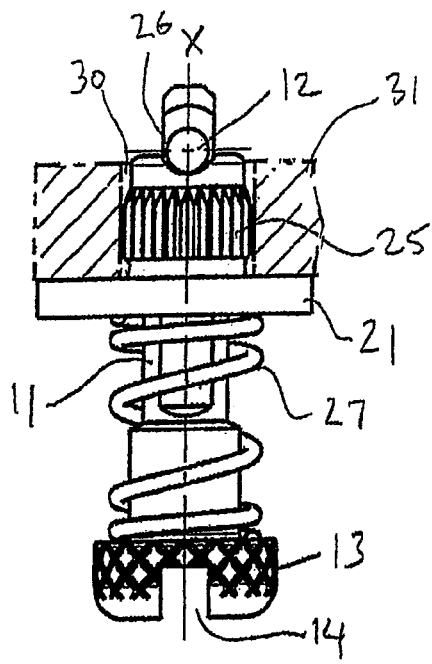
FIG. 11 shows a cross sectional view of the locking mechanism according to the first embodiment arranged in a part of an electrical connector with the insulation of the connector cutaway and the locking screw in its default position.

A locking mechanism is provided which is used to secure two electrical connectors together after the electrical contacts have mated. The locking mechanism can be used with many different types of electrical connectors.

The locking mechanism is in the form of a bayonet-type coupling which can easily and securely couple a male and female electrical connector together after they have electrically mated.

The locking mechanism comprises two assemblies: a first assembly being provided in one electrical connector (e.g. female electrical connector); and a second assembly being provided in the other electrical connecter (e.g. male electrical connector).

The first assembly of the locking mechanism forms a bayonet type plug. The various parts of the first assembly are shown in FIGS. 1 to 12. The first assembly includes a fastening member in the form of an unthreaded locking screw 10, a collar 20 that can receive the screw 10, the collar 20 being attachable to a first part of an interconnection device. In this embodiment, the first part of an interconnection device is a female miniature electrical connector.

The screw 10 is preferably made of metal such as stainless steel and is formed of a shaft portion 11 extending in a longitudinal direction and one end of the shaft portion 11 comprises a pin section 12 extending transversely to the longitudinal axis X of the shaft portion 11. The cross section of the shaft portion 11 is so as to allow the pin section 12 to be an integral part of the shaft portion 11 and manufactured from the same solid material as the shaft portion 11. This provides a cost effective manufacturing method for the screw 10. In this particular embodiment, the upper portion 11a of the shaft portion 11 nearest to the screw head 13 has a circular cross section and the remaining part of the screw has a cross sectional shape where two opposing surfaces 11b to which the pin sections 12 are formed are flat and the other two opposing surfaces 11c are curved. It is possible for the locking screw to have other profiles but the flat surfaces provide ease of manufacture.

The screw 10 also comprises a screw head 13 as a means for turning the screw. The screw head 13 includes a slot 14 to receive a tool (not shown) such as screwdriver and has a suitable surface around the edges of the screw head to enable gripping of the screw head. In this embodiment, the surface is a diamond knurl 15 but it will be appreciated that other types of surface can be used to enable gripping. The pin section 12 of the screw 10 is orientated to extend radially in the same transverse direction across the central longitudinal axis X of the shaft as the slot 14 of the screw head 13 and is therefore orientated to be in alignment with the slot 14. This provides an indication to a user that the pin section 12 of the screw 10 is orientated in a position ready to be mated to the second assembly (described later) and locked.

The collar 20 is preferably made of metal such as stainless steel and is formed of a part circular plate 21 which is shaped to abut the surface of a female electrical connector. The plate 21 also has a flat edge 21a to ensure correct orientation of the collar 20. A cylindrical portion 22 is upstanding and extends away from the plate 21. It is of a cross section to fit within through holes that are provided in the female electrical connector. The collar 20 has a through hole 23 that receives the shaft portion 11 of the screw 10. The cross sectional profile of the through hole 23 of the collar 20 is shaped to allow the shaft portion 11 of the screw 10 to pass through the collar 20 when the screw 10 is aligned with respect to the through hole 23 in a certain orientation. The cylindrical portion 22 comprises cutaway passages 24 arranged opposite each other to receive the pin section 12 of the screw 10. The screw 10 can be received in the through holes 24 only when the pin section 12 is aligned with the respective cutaway passages 24. The cylindrical portion 22 of the collar 20 is provided with protrusions to prevent rotation of the collar 20 with respect to the female electrical connector. This is achieved in this embodiment by a straight knurled surface 25 that forms projections that grip the inner part of the electrical connector when the collar 20 is received in the holes of the electrical connector. The knurled surface forms recesses in the holes of the electrical connector due to being an interference fit (i.e. held in place by means of friction).

The diameter of the through hole 23 in the collar 20 is larger than that of the shaft 11 of the screw 10 such that once the pin section 12 of the screw 10 has passed through the cutaway passages of the cylindrical portion 22, the screw 10 is capable of rotation within the through hole of the electrical connector. The end of the cylindrical portion 22 away from the plate 21 includes seating portions 26 diametrically opposite each other to receive the pin section 12 of the screw 10. Each seating portion 26 is a U-shaped groove formed by cutting away the end of the cylindrical portion 22. It will be appreciated that the shape of the groove will vary depending on the type of pin section that is to be received in the seating portion.

FIG. 11 shows the first assembly in its assembled form arranged in a through hole 30 of the insulating part 31 of a female electrical connector and in its default position. The pin section 12 of the screw 10 is seated on the seating portion 26 of the collar 20. A compression spring 27 which also forms part of the first assembly is provided between the underside of the screw head 13 and the top surface of the collar 20. The spring 27 urges screw head 13 and thus the screw 10 away from the collar 20 until the pin section 12 is received in the seating portion 26 of the collar. The screw shaft 11 is capable of rotating freely within the spring 27 when the pin section 12 is not positioned in the seating portion 26.

Figure 12:
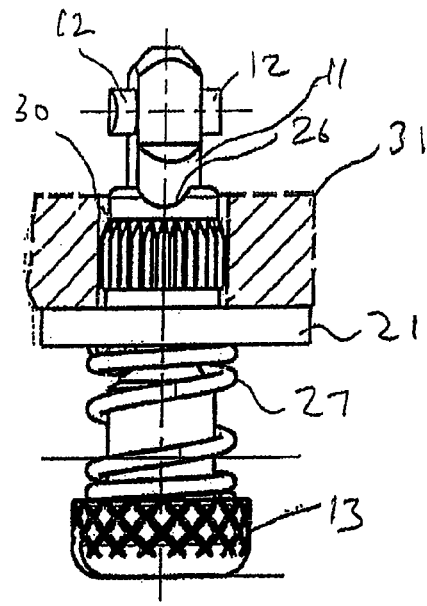
FIG. 12 shows the cross sectional view of FIG. 11 with the locking screw positioned as it would be when locked to the second assembly of the locking mechanism.

FIG. 12 shows the first assembly of FIG. 11 where the screw 10 has been subjected to a sufficient pushing and rotating force such that the spring 27 is compressed and the pin section 12 can move away from the seating portion 26 and can rotate.

An embodiment of a female connector that is provided with the first assembly is shown in FIGS. 13 to 16. The female connector 40 is formed of a body 41 within which there are two rows of ten recesses 42 each with a circular cross section. Within these recesses 42 are female electrical contacts 43 as shown in FIG. 17. It will be appreciated that a different number of rows or recesses could be provided depending on the electrical connector that is to be provided with the locking mechanism.

The body 41 has an upper section 44 and lower section 45. The width of the upper section 44 of the body 41 is smaller than the lower section 45 of the body 41. Adjacent the upper section 44 which houses the contacts 43 are the through holes 30 including the first assembly described hereinbefore. One part of the contact 43 will receive a male contact from a male connector and the other part of the contact 43 may receive an electrical conductor (not shown) for example. This will depend on the type of electrical connector used.

The upper section 44 of the body 41 is formed is a shaped block of a height and a profile that fits into a cavity in a male connector which is described later.

The second assembly of the locking mechanism will now be described with reference to FIGS. 18 to 23. In this embodiment, the second assembly consists of a single element. The second assembly comprises a retaining element 50 that is received in through holes of a male electrical miniature connector.

The retaining element 50 forms a bayonet type socket. It comprises a plate section 51 with a cylindrical section 52 upstanding and extending away from the plate section 51. The cylindrical section 52 comprises guide channels 53 for receiving the respective pin sections of the screw shaft according to the first assembly described hereinbefore. Each guide channel 53 is formed such that in the locked position, the screw from the first assembly will not be capable of rotational movement as the end of the channel 53 provides a detent surface 54 for the radial pin sections of the screw.

An embodiment of a male connector 60 that is provided with the second assembly is shown in FIGS. 23 to 27. The male connector 60 is formed of a body 61 comprising a cavity 62 having two rows of ten male electrical contacts 63. It will be appreciated that a different number of rows or contacts could be provided depending on the electrical connector that is to be provided with the second assembly of the locking mechanism. An upper section 63a of the electrical contacts 63 are contained within the cavity 62 and lower section 63b of the electrical contacts 63 extend out of the connector 60. The lower section of the contacts may be connected to a PCB (not shown) or another type of electrical socket. The lower section could be orientated in any manner depending on the type of electrical connector. For example, in this embodiment, where the lower section 63b is a PC (straight) tail, it can be received in a socket of a conventional connector thus forming an adapter. The lower section could alternatively be a surface mount tail at ninety degrees to the upper section 63a.

Adjacent the rows of electrical contacts 63 are holes 64 in the body 61 that include the second assembly described hereinbefore. The cylindrical section 52 of the retaining element 50 is inserted into the holes 64 from the underside 60a of the connector 60 where the electrical contacts 63 extend away, and the plate section 51 of the retaining element 50 is fixed with respect to the body 61 This is achieved by a retention barb 55 that is an interference fit in the receiving hole 64 to ensure the element 50 is gripped in place in similar manner to a knurled surface 25 of the collar 20.

Referring to FIGS. 11, 12, 13 and 26, in order to electrically connect the male connector 40 and female connector 60, the cavity 62 of the male connector 60 is aligned with and receives the upper section 44 of the body 41 of the female connector 60. Thus, the upper section 63a of the electrical contacts 63 of the male connector 60 are inserted into the recess 42 of female electrical connector which contain the electrical contacts 43, and electrical mating is achieved. To lock the two connectors together, the locking screw 10 of the locking mechanism is pushed into the retaining element 50 of the locking mechanism against the force of the spring 27 and turned one hundred and one degrees (i.e. partially rotated) in a clockwise direction about its longitudinal axis X from its default position. The pin section 12 of the screw shaft 11 is thus guided along the channel 53 of the retaining element 50 and urged by the spring 27 to the locked position.

Accordingly, with the locking mechanism it is possible to achieve a bayonet type connection in a miniature electrical connector with very few assembled parts which is particularly useful in miniature connectors where there is very limited space. The locking mechanism can be adapted for use with a number of electrical connectors and more particularly PCB level connectors. In the first embodiment, only four assembled parts are used (the locking screw, collar, spring and retaining member).

The method of assembling the locking mechanism in the female connector includes providing a hole in insulating portion of a connector, inserting a collar into the hole, providing a locking screw in the collar, and positioning a spring between the head of the locking screw and the collar. The locking mechanism in the female connector is provided by simply inserting a retaining member that is to be mated with the locking screw in the male connector.

It will be appreciated that although the first embodiment shows a locking screw that needs to be pushed and turned ninety degrees in a clockwise direction to be locked with the retaining member, it is possible to modify the locking screw, through hole in the collar and/or guide channels in the retaining member to allow for different directions and angles of rotation to lock the locking screw in position with the retaining member.

Figure 13:
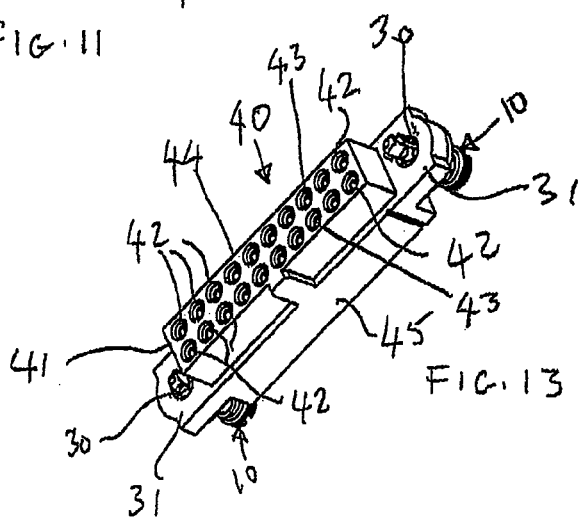
FIG. 13 shows a perspective view of a female electrical connector that is provided with the locking mechanism of FIGS. 1 to 12.
Figure 14:
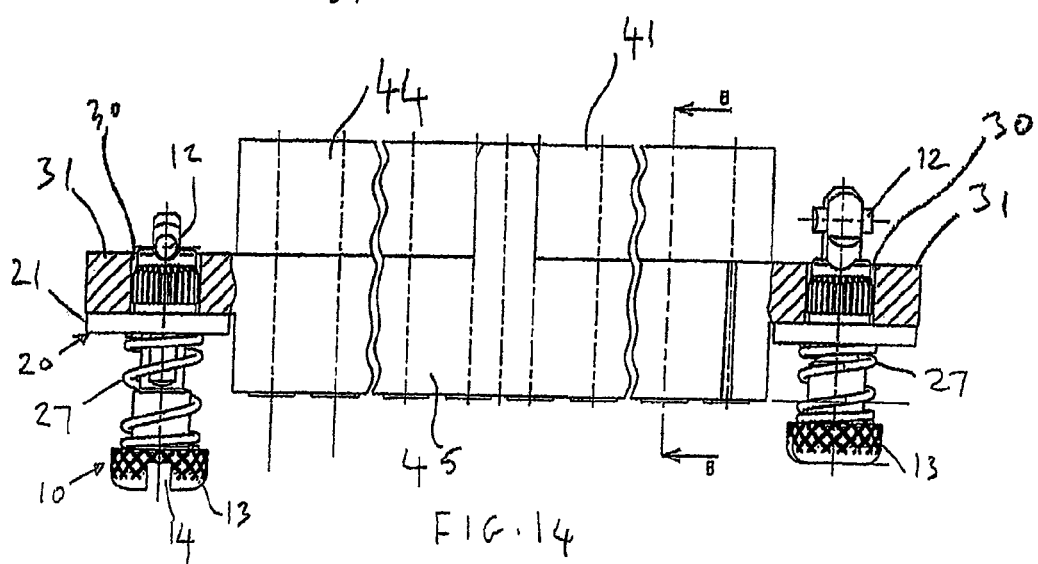
FIG. 14 shows a side view of parts of the connector of FIG. 13 with the insulation proximal the locking mechanism cutaway.
Figure 15:
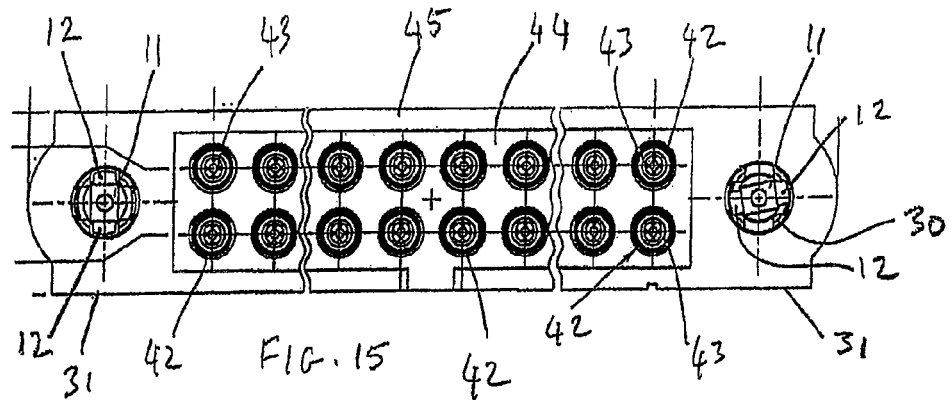
FIG. 15 shows a view of the connector in FIG. 14 from below the locking screw.
Figures 16, 17:
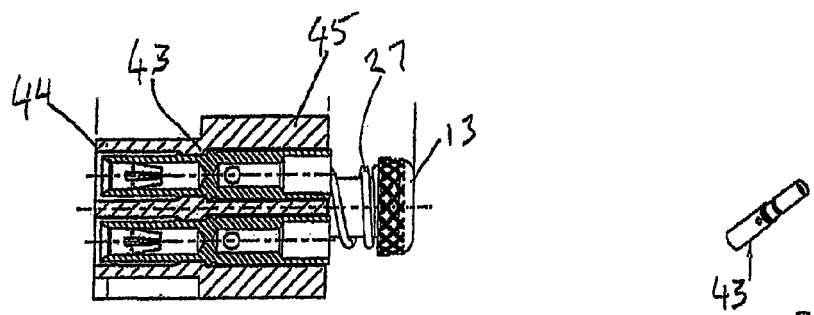
FIG. 16 shows a cross sectional view of FIG. 14 taken along B-B.
FIG. 17 shows a perspective view of an electrical female contact provided in the contact section of the female electrical connector shown in FIGS. 13 to 16.
Figure 18:
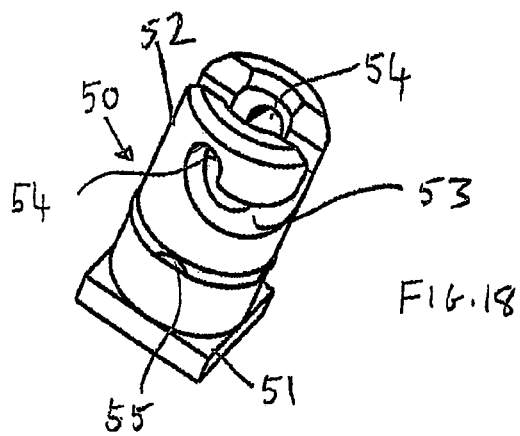
FIG. 18 shows a perspective view of a retaining member which forms part of a locking mechanism according to a first embodiment.
Figure 19:
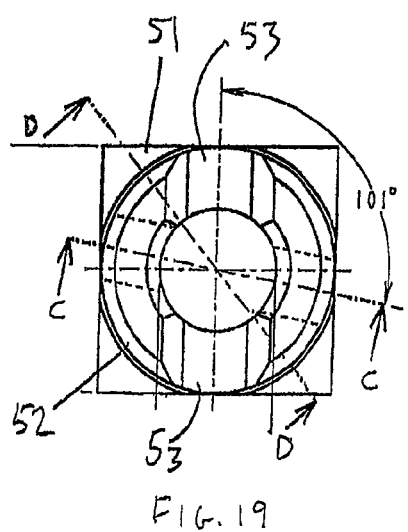
FIG. 19 shows a view of the retaining member of FIG. 18 from above.
Figure 20:
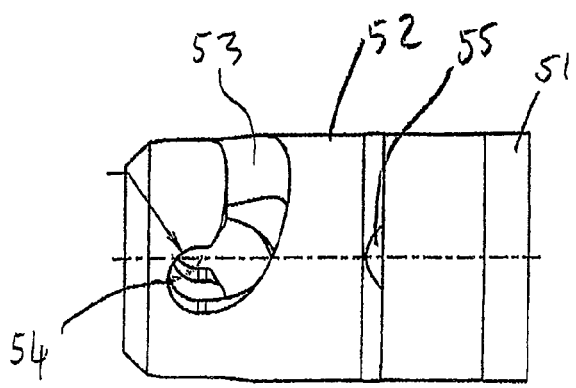
FIG. 20 shows the retaining member in the orientation of FIG. 19 from one side.
Figure 21:
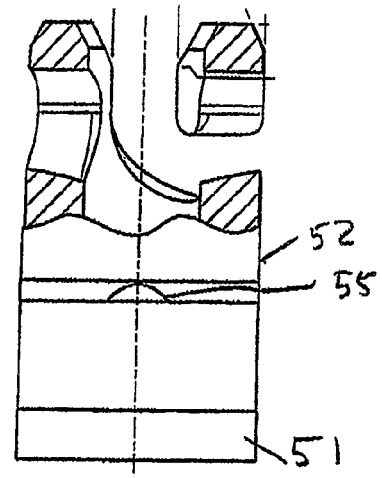
FIG. 21 shows a cross sectional view of FIG. 19 taken along C-C.
Figure 22:
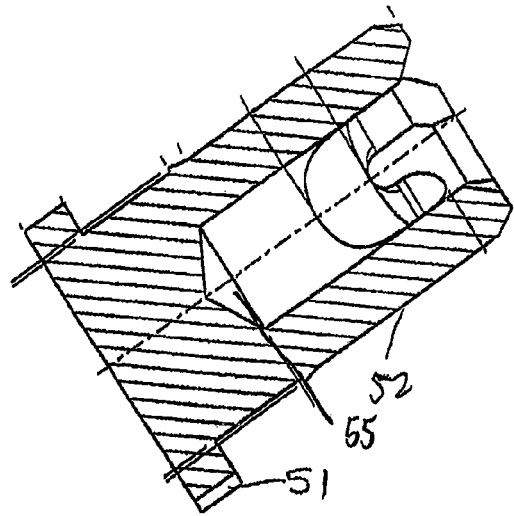
FIG. 22 shows a cross sectional view of FIG. 19 taken along D-D.
Figure 23:
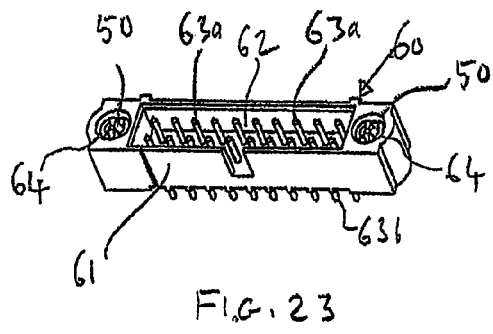
FIG. 23 shows a first perspective view of a male electrical connector that is provided with the locking mechanism of FIGS. 18 to 22.
Figure 24:
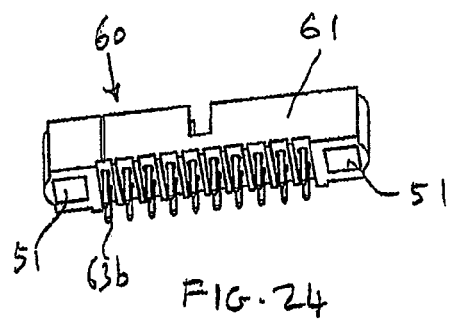
FIG. 24 shows a second perspective view of a male electrical connector shown in FIG. 23.
Figure 25:
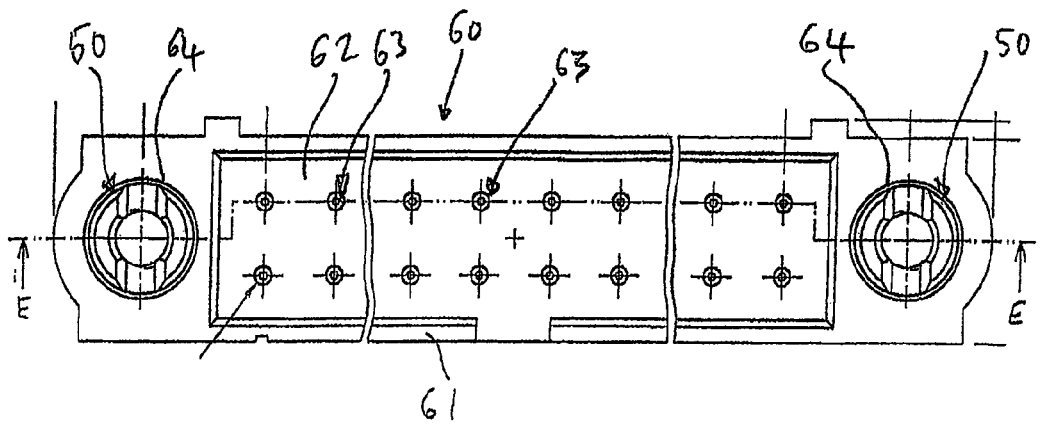
FIG. 25 shows a view of the connector in FIG. 23 from above the retaining member.

Alternatively to the embodiment shown in FIGS. 13 and 23, it is possible to use the first assembly in the male electrical connector and the second assembly in the female electrical connector, and if this is the case, the appropriate modifications can be made.

It will be appreciated that the locking mechanism can be used with different types of electrical connectors where electrical mating and mechanical locking are provided separately.

Although in the first embodiment, two identical locking mechanisms are provided, it is possible to provide one locking mechanism if there is restricted space or more locking mechanisms depending the shape and size of the connector.

The invention claimed is:

1. An apparatus for locking two electrical connectors together, the apparatus comprising: a first assembly comprising a locking member having a radially extending element, wherein the radially extending element has a diameter no greater than said locking member; a collar with a through hole for receiving the locking member; and a spring positioned between the locking member and the collar, and a second assembly comprising a retaining member having a guide channel such that in use the radially extending element of the locking member is adapted to cooperate with the guide channel to form a bayonet type connection and lock the first assembly and second assembly together.

2. The apparatus of claim 1 wherein the locking member is a solid unthreaded locking screw.

3. The apparatus of claim 1 wherein the locking member comprises a shaft portion extending in a longitudinal direction and one end of the shaft portion comprises the two radially extending elements.

4. The apparatus of claim 3 wherein the radially extending elements are fixed and an integral part of the shaft portion.

5. The apparatus of claim 4 wherein the surfaces of the shaft portion from which the radially extending elements extend are flat.

6. The apparatus of claim 1 wherein the locking member comprises a screw head having a slot for receiving a tool, and the radially extending element is orientated to be in alignment with the slot.

7. The apparatus of claim 1 wherein the collar comprises a plate and a cylindrical portion upstanding and extending away from the plate.

8. The apparatus of claim 7 wherein the cylindrical portion comprises cutaway passages arranged opposite each other to receive the radially extending element of the locking member.

9. The apparatus of claim 7 wherein the cylindrical portion comprises protrusions to prevent rotation of the collar.

10. The apparatus of claim 7 wherein the end of the cylindrical portion away from the plate includes seating portions diametrically opposite each other to receive the extending element of the locking member.

11. The apparatus of claim 7 wherein the spring is a compression spring and the cylindrical portion is provided on one side of the plate and the spring is provided on the other side of the plate to the cylindrical portion.

12. The apparatus of claim 1 wherein the end of the guide channel in the retaining member provides a detent surface in order to prevent rotational movement of the radially extending element of the locking member.

13. The apparatus of claim 1 wherein the retaining member comprises a retention barb for preventing rotation of the retaining member.

14. The apparatus of claim 1, wherein the through hole of the collar is sized to allow the radially extending element to pass through.

15. An electrical connector comprising: an electrical contact section for electrically mating with another electrical connector; and a mechanical locking means including an assembly comprising a locking member having a radially extending element, wherein the radially extending element has a diameter no greater than said locking member; a collar with a through hole for receiving the locking member; and a spring positioned between the locking member and the collar, whereby the assembly provides a bayonet type connection with the other connector.

16. The apparatus according to claim 15, wherein the collar is positioned in a hole in the electrical connector, the locking member being arranged in the collar so as to be rotatably movable with respect to the collar and allow the radially extending element to pass through the collar.

17. An electrical connector comprising: an electrical contact section for electrically mating with the electrical connector of claim 15; and a mechanical locking means including a retaining member that is received in a hole in the electrical connector, the retaining member having a guide channel for cooperating with the radially extending element of the locking member in order to provide a bayonet type connection with the connector of claim 15.

18. A electrical connection arrangement comprising: a first electrical connector and a second electrical connector according to claim 17, wherein the electrical contact section of the first electrical connector is adapted to be electrically connected to the electrical section of the second electrical connector, and the mechanical locking section of both connecters are coupled by way of a bayonet-type connection.

19. A method of constructing a locking mechanism comprising: providing a hole in a first connector; inserting a collar into the hole; providing a locking member having a radially extending element into the collar, wherein the radially extending element has a diameter no greater than said locking member; positioning a spring between a head of the locking member and the collar; providing a hole in a second connector; and inserting a retaining member having a guide channel into the hole of the second connector, wherein the radially extending element of the locking member is adapted to cooperate with the guide channel of the retaining member in order to form a bayonet type connection and mechanically lock the first and second connector.

* * * * *